US011499922B2

(12) United States Patent
Pearson et al.

(10) Patent No.: US 11,499,922 B2
(45) Date of Patent: Nov. 15, 2022

(54) CAMERA-BASED DRUG CONTAINER INSPECTION (71) Applicant: AMGEN INC., Thousand Oaks, CA (US)

(72) Inventors: Thomas C. Pearson, Newbury Park, CA (US); Neelima Chavali, Newbury Park, CA (US); Dmitry Fradkin, Woodland Hills, CA (US); Graham F. Milne, Ventura, CA (US); Erwin Freund, Camarillo, CA (US)

(73) Assignee: AMGEN INC., Thousand Oaks, CA (US)

(*) Notice: Subject to any disclaimer, the term of this patent is extended or adjusted under 35 U.S.C. 154(b) by 0 days.

(21) Appl. No.: 16/977,025

(22) PCT Filed: Feb. 12, 2019

(86) PCT No.: PCT/US2019/017602
§ 371 (c)(1),
(2) Date: Aug. 31, 2020

(87) PCT Pub. No.: WO2019/190647
PCT Pub. Date: Oct. 3, 2019

(65) Prior Publication Data
US 2021/0010946 A1    Jan. 14, 2021

Related U.S. Application Data (60) Provisional application No. 62/650,554, filed on Mar. 30, 2018.

(51) Int. Cl.
G01N 21/90    (2006.01)
(52) U.S. Cl.
CPC ..... G01N 21/9018 (2013.01); G01N 21/9009 (2013.01)

(58) Field of Classification Search
CPC ........... G01N 21/9018; G01N 21/9009; G01N 21/9054; G01N 21/958; G01N 2021/8967
See application file for complete search history.

(56) References Cited

U.S. PATENT DOCUMENTS 3,529,167 A    9/1970  Calhoun
3,690,456 A *  9/1972  Powers, Jr. ........ G01N 21/9009
                                                  73/104

(Continued)

FOREIGN PATENT DOCUMENTS

WO    WO-2010128384 A1    11/2010

OTHER PUBLICATIONS

International Search Report and Written Opinion for International Application No. PCT/US2019/017602, dated Apr. 25, 2019.

(Continued)

Primary Examiner — Sang H Nguyen
(74) Attorney, Agent, or Firm — Marshall, Gerstein & Borun LLP (57) ABSTRACT An inspection system for a drug container is provided to identify foreign matter, such as particles or fibers, within the drug container prior to filling with a drug. The system includes a camera device aligned with an axis of the drug container and captures a series of images of an interior surface of a sidewall of the drug container while the robot causes relative movement between the drug container and the camera device along a linear path. Atypical lighting, which improves contrast between particles and the background in images is employed to aid detection. A control circuit then processes the series of images to identify foreign matter within the drug container.

20 Claims, 5 Drawing Sheets

(56) References Cited

U.S. PATENT DOCUMENTS

| | | | | |
|---|---|---|---|---|
| 4,262,196 | A * | 4/1981 | Smith | G01N 21/8851 250/223 B |
| 4,731,649 | A * | 3/1988 | Chang | G01N 21/9054 250/223 B |
| 4,798,096 | A * | 1/1989 | Bogatzki | B07C 5/124 73/12.01 |
| 4,874,940 | A * | 10/1989 | McMeekin | G01N 21/9018 356/239.5 |
| 5,466,927 | A * | 11/1995 | Kohler | G01N 21/9045 250/223 B |
| 5,492,023 | A * | 2/1996 | Kitamura | G01N 33/442 73/866 |
| 6,012,344 | A * | 1/2000 | Halbo | B08B 9/46 198/339.1 |
| 6,275,287 | B1 * | 8/2001 | Watanabe | G01N 21/9054 356/428 |
| 2005/0174571 | A1 * | 8/2005 | Cochran | G01N 21/8806 356/240.1 |
| 2007/0084763 | A1 | 4/2007 | Stephenson et al. | |
| 2008/0001104 | A1 * | 1/2008 | Voigt | G01N 21/8851 250/559.46 |
| 2010/0116026 | A1 * | 5/2010 | Varhaniovszki | G01N 1/2226 73/31.03 |
| 2011/0221885 | A1 * | 9/2011 | Suzuki | G01N 21/21 348/125 |
| 2013/0107249 | A1 * | 5/2013 | Kohler | G01N 21/9054 356/239.4 |
| 2013/0208105 | A1 | 8/2013 | Schmidt et al. | |
| 2016/0054245 | A1 * | 2/2016 | Weinstein | G01N 25/72 250/339.14 |
| 2017/0124704 | A1 | 5/2017 | Wu et al. | |

OTHER PUBLICATIONS

Singapore Patent Application No. 11202007756X, Written Opinion, dated Feb. 16, 2022.

* cited by examiner

FIG. 1

Image of Container with 125 um Particles on Sidewall

FIG. 2

Image with Particles at 3,4, and 7 O'Clock Positions

FIG. 3A

Subtraction of the Two Images Highlight Particles and Remove Background Artifacts

FIG. 3C

Image Taken when Camera was Slightly Lower, Particles are Out of Focus

CAMERA-BASED DRUG CONTAINER INSPECTION

CROSS-REFERENCE TO RELATED APPLICATION

This is the US National Phase of International Patent Application No. PCT/US2019/017602, filed Feb. 12, 2019, which claims the priority benefit of U.S. Provisional Patent Application 62/650,554, filed on Mar. 30, 2018. The entire contents of each of the foregoing applications are incorporated herein by reference.

FIELD OF THE DISCLOSURE

The present disclosure generally relates to quality control inspection of drug containers and, more particularly, to inspection of empty drug containers for foreign matter present on the inside.

BACKGROUND

Foreign matter, which may be adhered to or embedded in the inside surfaces of drug product containers, can pose health and safety issues. While containers can be manufactured in clean environments and inspected before packaging, foreign matter can be found in the containers when they arrive at filling facilities. A current method for quality control inspection includes rinsing the container with a liquid agent, filtering the rinsed liquid, and then inspecting the filter with a microscope. Due to the tedious nature of this method, the number of containers to be inspected can often be limited. As a result of this, if any particles are found in an incoming batch of containers, large numbers of empty containers can be discarded. Further, after containers have been filled and stoppered, if any containers are found to have particles, the containers are discarded along with the potentially expensive drug product therein. Accordingly, the current method for quality control inspection is slow and can result in wasteful and expensive discarding of containers and drug product.

SUMMARY

In accordance with a first exemplary aspect, an inspection system for a drug container to identify foreign matter, such as particles or fibers, is disclosed that includes a camera device having a lens and a robot having a portion movable along a linear path. The camera device is coupled to the portion of the robot and aligned with a longitudinal axis of the drug container, such that the robot causes relative movement between the camera and the drug container along the longitudinal axis. The inspection system further includes a control circuit that is in communication with the camera device. The control circuit includes a processor, a memory, and logic stored on the memory that is executable by the processor to receive the series of images from the camera device and process the series of images to identify foreign matter shown in the images.

In accordance with one preferred form, the portion of the robot is a vertical or horizontal portion and the robot further includes a depth portion configured to move the camera device along a row of drug containers and a width portion configured to move the camera device over to adjacent rows of drug containers.

In accordance with one preferred form, the logic is further executable by the processor to operate the robot.

In accordance with one preferred form, the logic executable by the processor to process the series of images to identify foreign matter shown in the images includes the logic executable by the processor to compare a particular image of the series of images to at least one image taken immediately before or after the particular image to identify differences.

In accordance with one preferred form, the logic executable by the processor to process the series of images to identify foreign matter shown in the images includes the logic executable by the processor to combine the series of images into a combined image showing all of the interior surface of the sidewall of the drug container in focus to identify foreign matter.

In accordance with one preferred form, the inspection system further includes a light source that is oriented to project light at the drug container and illuminate a portion of the drug container within a depth of field of the camera device. In accordance with a further form, the light source can be movable along the drug container to thereby illuminate a portion of the drug container within a depth of field of the camera device as the camera device is moved along the linear path.

In accordance with a second exemplary aspect, a method of inspecting a drug container for foreign matter is disclosed that includes orienting a camera device along a longitudinal axis of a drug container, moving the camera device relative to the drug container or moving the drug container relative to the camera device along the longitudinal axis and/or rotating the container, operating the camera device to capture a series of images of an interior surface of a sidewall and/or bottom wall of the drug container, and processing the series of images with a control circuit to identify foreign matter shown in the series of images.

In accordance with one preferred form, the method includes moving the camera device along the longitudinal axis by operating a robot to move a portion thereof along a linear path, where the camera device is coupled to the portion of the robot. In accordance with a further form, the method can further include operating the robot to move the camera device along a row of drug containers with a depth portion and operating the robot to move the camera device to adjacent rows of drug containers with a width portion.

In accordance with one preferred form, the method can further include opening an aperture of a lens of the camera device to a maximum setting to reduce visible depth of field.

In accordance with one preferred form, processing the series of images can include comparing a particular image of the series of images to at least one image taken immediately before or after the particular image to identify differences.

In accordance with one preferred form, processing the series of images comprises combining the series of images into a combined image showing all of the interior surface of the sidewall of the drug container in focus to identify foreign matter.

In accordance with one preferred form, the method can further include sending a detection signal with the control circuit in response to identifying foreign matter in the series of images.

In accordance with one preferred form, the method can further include operating a light source to project light at the drug container and illuminate portion of the drug container within a depth of field of the camera device. In accordance with a further form, the method can further include moving the light source along a height of the drug container corresponding to movement of the camera device along the longitudinal axis.

BRIEF DESCRIPTION OF THE DRAWINGS

The above needs are at least partially met through provision of the embodiments described in the following detailed description, particularly when studied in conjunction with the drawings, wherein.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments. It will further be appreciated that certain actions and/or steps may be described or depicted in a particular order of occurrence while those skilled in the art will understand that such specificity with respect to sequence is not actually required. It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION

Systems, assemblies, and methods are provided that utilize a camera device to provide non-contact inspection of drug containers. The non-invasive procedure, not utilizing a fluid as with a conventional method, provides faster inspections over the conventional method, enabling more containers to be inspected and/or shorter inspection times for each batch of containers. Fluid rinse detection modes can suffer from false positives because the rinse method uses a washing fluid that is not 100% free of particles (introduced by the environment) as it uses a jet stream of fluid to rinse the container, whereas an imaging system is much less likely to introduce artefacts, particularly when the process is performed in a clean room environment. Further, container inspection methods as provided herein can be automated, which will further increase inspection speed over conventional methods. As such, container and/or syringe quality from manufacturers can be increased, discarded batches can be reduced, and the risk of non-compliance due to foreign matter in filled containers can be reduced.

Figure 1:
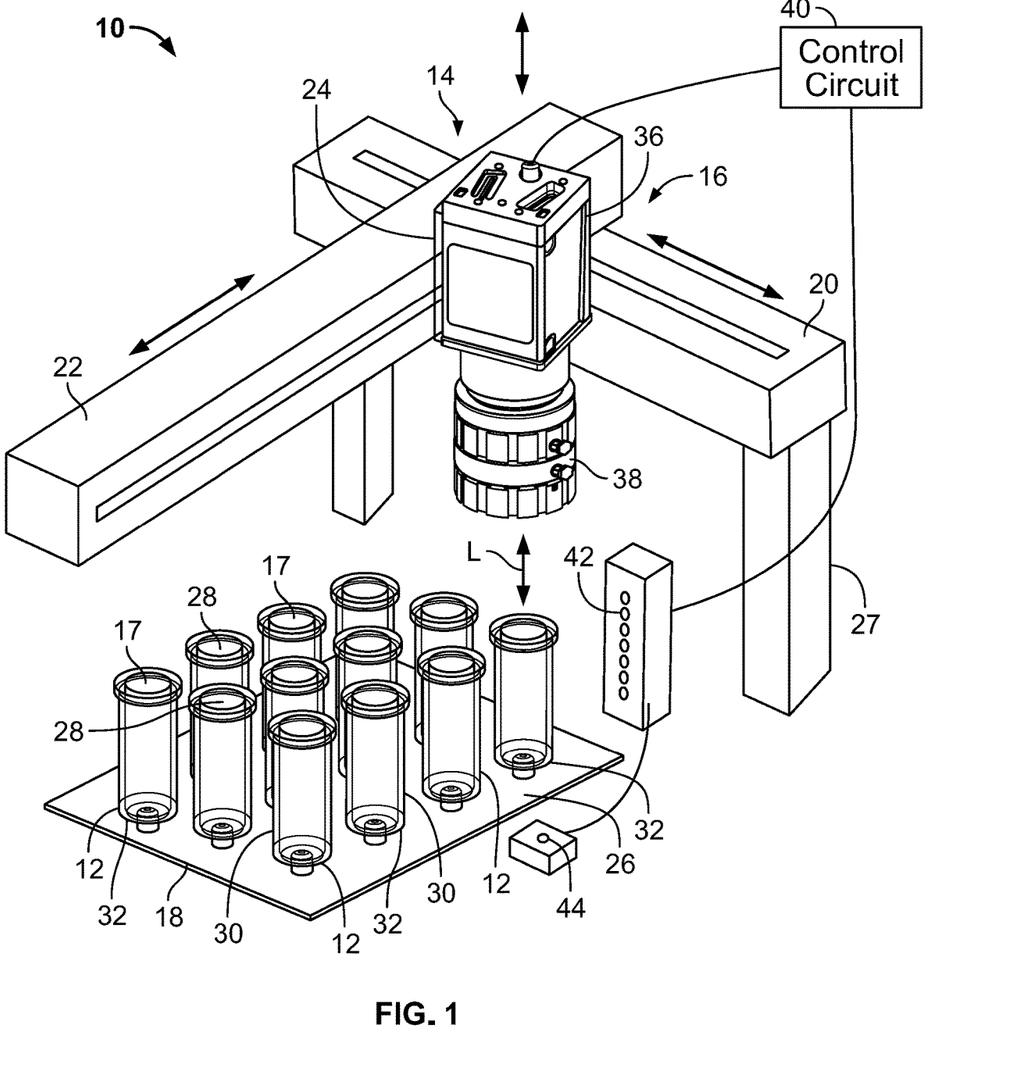
FIG. 1 is a perspective view of a camera assembly for inspecting drug containers for foreign matter in accordance with various embodiments of the present disclosure.

Details of example assemblies and images providing these advantages and more are shown in FIGS. 1-5. FIG. 1 shows an inspection system 10 for drug containers 12, such as syringes, reservoirs, barrels, cartridges, and so forth. As illustrated, the system 10 includes a camera device 14 coupled to a robot 16 operative to drive the camera device 14 towards and away from individual ones of the containers 12. The robot 16 can be configured as commonly understood to include various components, such as actuators, tracks, gears, and so forth. With this configuration, the camera device 14 can be operated to capture a series of images of an interior surface 17 of the container 12 (including both sidewalls and bottom wall) to determine if there is any foreign matter 34 (e.g., particles, fibers, etc.) within the container 12 prior to filling the container 12 with a drug.

In one form, the containers 12 are distributed in an array, such as in a tray 18 or other storage container for storage and transportation purposes. In order to increase the speed of the inspection process, in one form, the robot 16 can have one or more linear actuators including, for example, horizontal x and y-axis components 20, 22 that are configured to move in a horizontal plane to move the camera device 14 forward, backward, and sideways, and a vertical z-axis component 24 that is configured to move along a vertical linear path to move the camera device 14 towards and away from a particular container 12. For example, the robot 16 can be a Cartesian robot. As commonly configured, the components 20, 22, 24 are movable with respect to one another and with respect to a work surface 26 to move the camera device 14 along any desired axis so that the camera device 14 can be positioned adjacent any desired container 12 on the work surface 26. In another form, the robot 16 can be configured with a single horizontal component to inspect a row of containers 12.

In the configuration shown in FIG. 1, the camera device 14 is coupled to the vertical component 24, which is movably coupled to the depth y-axis component 22, which is movably coupled to the width x-axis component 20. Of course, other configurations are within the scope of this disclosure. The components 20, 22, 24 are mounted to a supporting structure 27 elevating the components 20, 22, 24 over the work surface 26. Further, although the assembly is shown to position the camera device 14 vertically over the container 12, angled or horizontal configurations can also be utilized.

As shown in FIG. 1, each container 12 includes an open top 28, a sidewall 30 extending along a longitudinal axis L, and a bottom wall 32. As discussed above, the inside surfaces of the containers 12 may become contaminated with foreign matter 34 prior to being filled with a drug or other fluid therapeutic product. The sidewall 30 can be cylindrical, box-shaped, or other desired shapes. Further, the containers 12 can include any other features of drug containers as commonly configured, such as an angled bottom wall, a bottom opening for a needle coupling, outwardly projecting flanges, and so forth.

Figure 2:
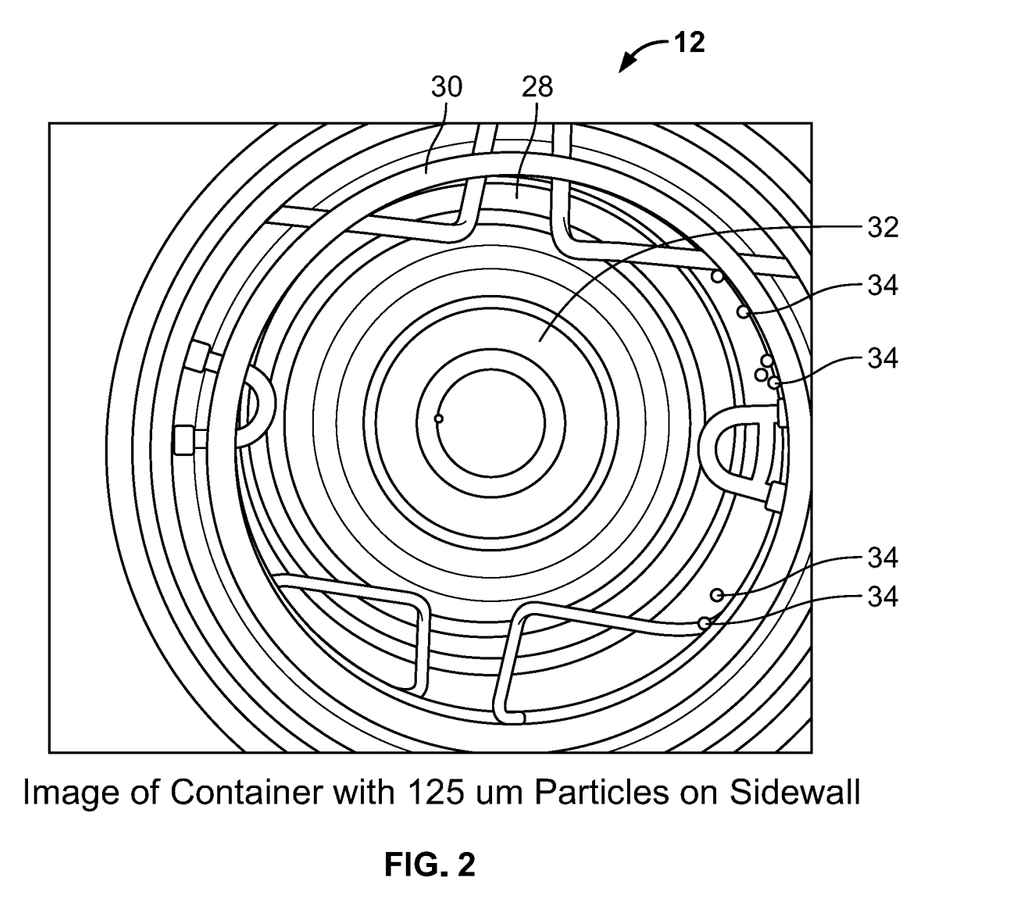
FIG. 2 is a top plan image of a drug container showing foreign matter on a sidewall in accordance with various embodiments of the present disclosure.
Figure 3A:
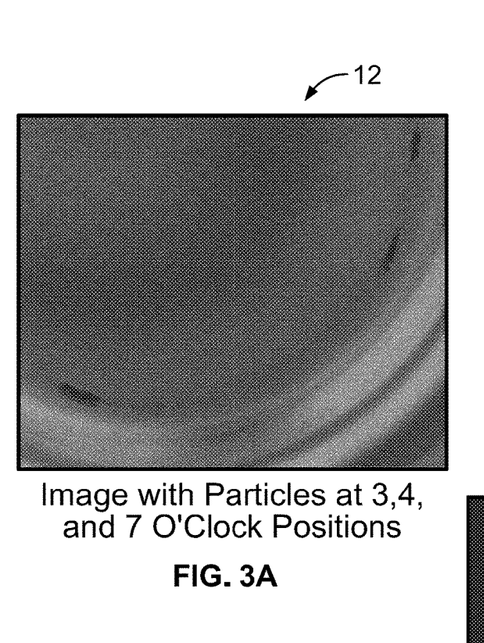
FIG. 3 is a series of top plan images showing a first image of a container, a second image of the container, and a third image subtracting the first and second images in accordance with various embodiments of the present disclosure.
Figure 3B:
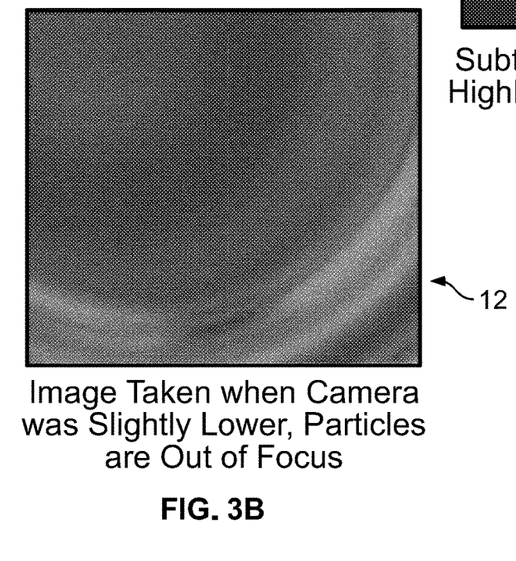
Figure 3C:
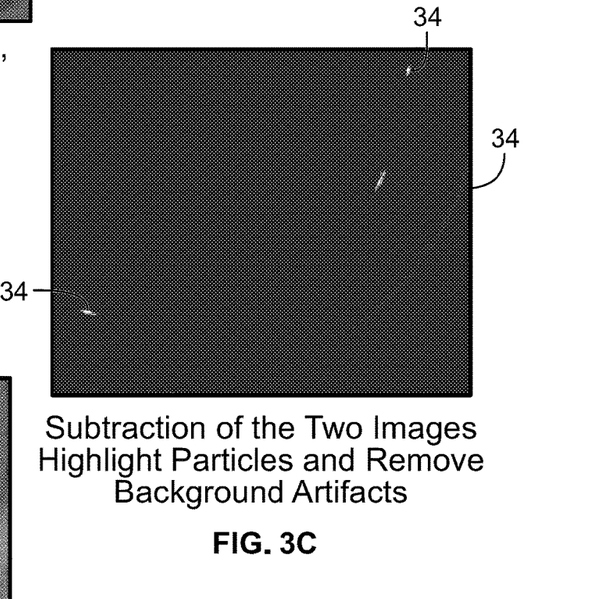

In order to detect the foreign matter 34, such as particles, fibers, and so forth, the camera device 14 can include a high-resolution camera 36 (e.g., CCD, CMOS, etc.) and a lens 38. For example, the camera 36 can have a resolution between two and twenty megapixels. The lens 38 can be a telecentric or other macro lens, or can include 360° optics, such as the PCHI series provided by Opto Engineering. Further, an aperture of the lens 38 is preferably opened to the maximum to reduce a depth of field for the camera 36 to a narrow "slice" of the container 12 being inspected. So configured, when operated, the camera 36 captures an image of the container 12 with the "slice" in focus. An example image of such a "slice" of a container 12 is shown in FIG. 2, where foreign matter 34 are visible on the sidewall 30 of the container 12.

In order to inspect an entire height of an interior surface 17 of the sidewall 30 and the bottom wall 32 for the foreign matter 34, the camera 36 and lens 38 are oriented to capture images along the longitudinal axis L of the container 12. For some containers 12, the depth of field of the camera device 14 may not be sufficient to inspect the entire sidewall 30 with one image. As such, the robot 16 can be configured to position the camera device 14 so that the focused slice is disposed at the top or bottom of the container 12. Thereafter, the robot 16 moves the camera device 14 toward or away from the container 12 along the longitudinal axis L while the camera device 14 sequentially takes a series of high resolution images of each slice of the container 12. In other configurations, relative movement between the camera and the containers along the longitudinal axis can be achieved by moving the containers while maintaining the camera in a fixed position. For example, in some versions, the robot can include a translatable table (not shown) supporting the containers where the table is actuatable to move the containers along the longitudinal axis (or other axes) relative to the camera. In some other versions, the table can be equipped with individual seats for each drug container and a rotational drive coupled to each individual seat. So configured, the robot can be equipped to rotate each container during the image capture process, which can help avoid asymmetrical illumination of the containers by way of one or more light sources, which will be described more fully below.

A control circuit 40 is operably coupled to or in communication with the camera device 14 to receive images taken thereby. If desired, the control circuit 40 can operate the robot 16 and camera device 14. The control circuit 40 is configured to analyze the series of images to detect any foreign matter 34 on the sidewall 30 or bottom wall 32 of the container 12. The term control circuit as used herein refers broadly to any microcontroller, computer, or processor-based device with processor, memory, and programmable input/output peripherals, which is generally designed to govern the operation of other components and devices. It is further understood to include common accompanying accessory devices, including memory, transceivers for communication with other components and devices, etc. These architectural options are well known and understood in the art and require no further description here. The control circuit 40 may be configured (for example, by using corresponding logic stored in a memory as will be well understood by those skilled in the art) to carry out one or more of the steps, actions, and/or functions described herein.

The control circuit 40 can analyze the series of images to detect the foreign matter 34 utilizing any suitable image processing method. In a first approach, as demonstrated in FIG. 3, the control circuit 40 filters the series of images in three-dimensions. More particularly, for each image, the control circuit 40 compares the image (FIG. 3(*a*)) to one or more images taken immediately above and/or below it (FIG. 3(*b*)) to identify any differences between the images. In a preferred approach, the control circuit 40 compares the image to at least the image taken immediately above and below it, and preferably both the images taken immediately above and below.

This processing method allows the control circuit 40 to effectively subtract the common elements between the images, including the background and sidewall 30 of the container 12. As such, only foreign matter 34, if there are any, are left in the resulting subtracted image (FIG. 3(*c*)), which leaves the foreign matter 34 clearly visible and detected by the algorithm. The control circuit 40 can be configured to analyze each of the series of images or can be configured to analyze images until foreign matter 34 is detected in order to speed up the inspection process. Deep learning algorithms can be utilized within the control circuit on the subtracted image (FIG. 3(*c*)) to help distinguish particles from other non-particle/fiber artifacts that may appear in the images.

By another approach, the control circuit 40 can stack or combine all of the series of images such that the entire sidewall 30 and bottom wall 32 is in focus. Thereafter, the control circuit 40 can scan the combined image to identify any foreign matter 34 for the full container 12.

While the above methods may be suitable for many applications and containers, the inspection system 10 can further include one or more light sources 42 oriented to project light on a container 12 being inspected. The light sources 42 can be controlled or otherwise optimized to highlight the container 12 corresponding to the focused slice being captured by the camera device 14 to highlight any foreign matter 34, while simultaneously darkening the background. In some versions, the light source can be a direct light source, an indirect light source utilizing mirrors or other reflectors, or another suitable light source. In at least one version, the light source can include a bank of LEDs fixed in a vertical configuration with a control to illuminate only a section (e.g., a horizontal row) of containers that are associated with the camera similar to that illustrated in FIG. 1, for example.

Figure 4:
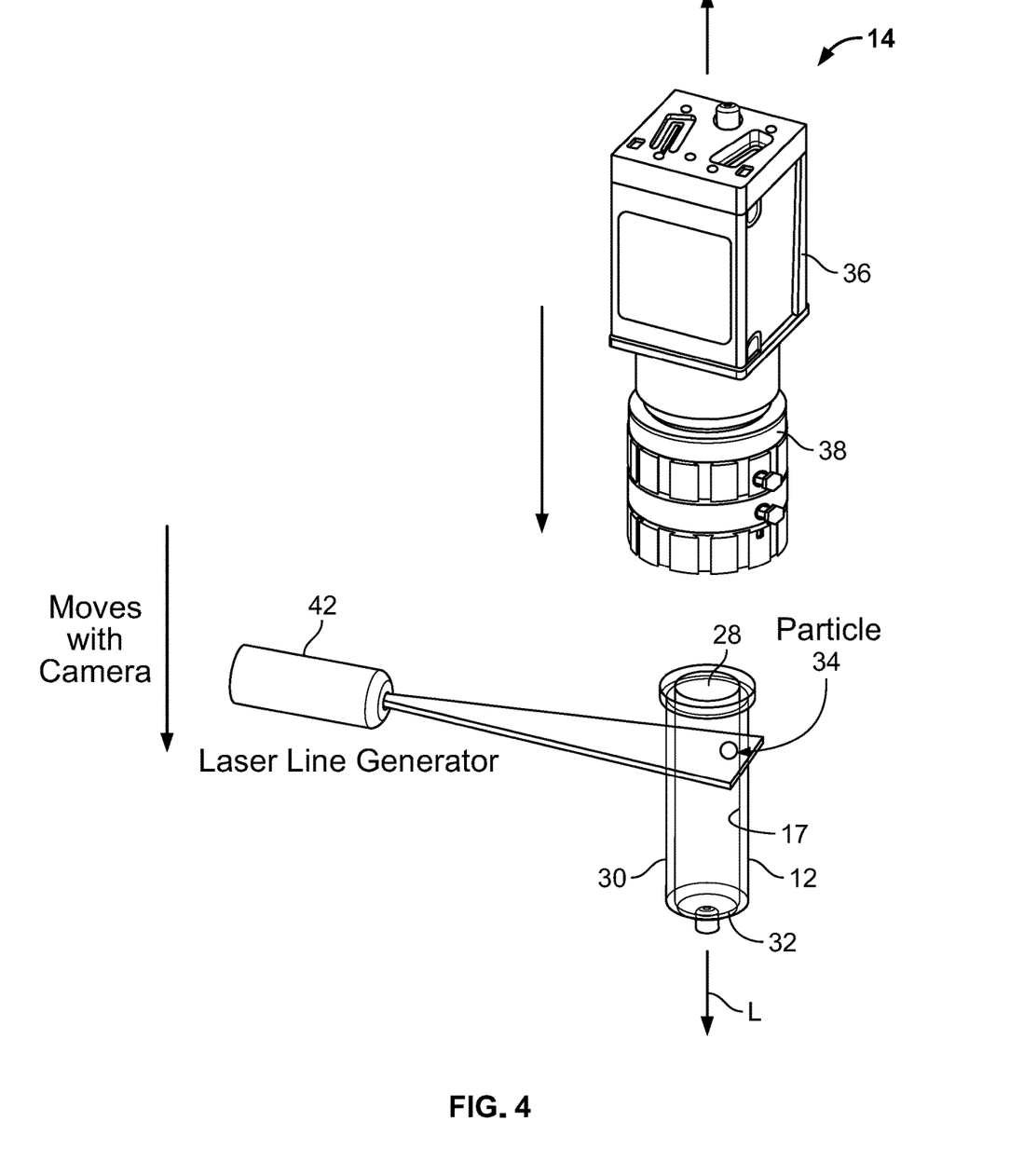
FIG. 4 is a perspective view of a camera and laser setup for inspecting drug containers for foreign matter in accordance with various embodiments of the present disclosure.

In a first approach as shown in FIG. 1, the system 10 can include a plurality of light sources 42 that are spaced along the height of the container 12 to thereby selectively illuminate portions of the container 12. Alternatively, in a second approach as shown in FIG. 4, the system 10 can include a single light source 42 that is movable along the height of the container or pivotable to selectively illuminate desired portions of the container 12. In yet another approach, the system 10 can include a bottom light source 44 configured to illuminate particles or fibers 34 on the bottom wall 32. With any of the above approaches, operation and/or movement of one or more of the light sources 42 can be controlled by the control circuit 40.

Figure 5:
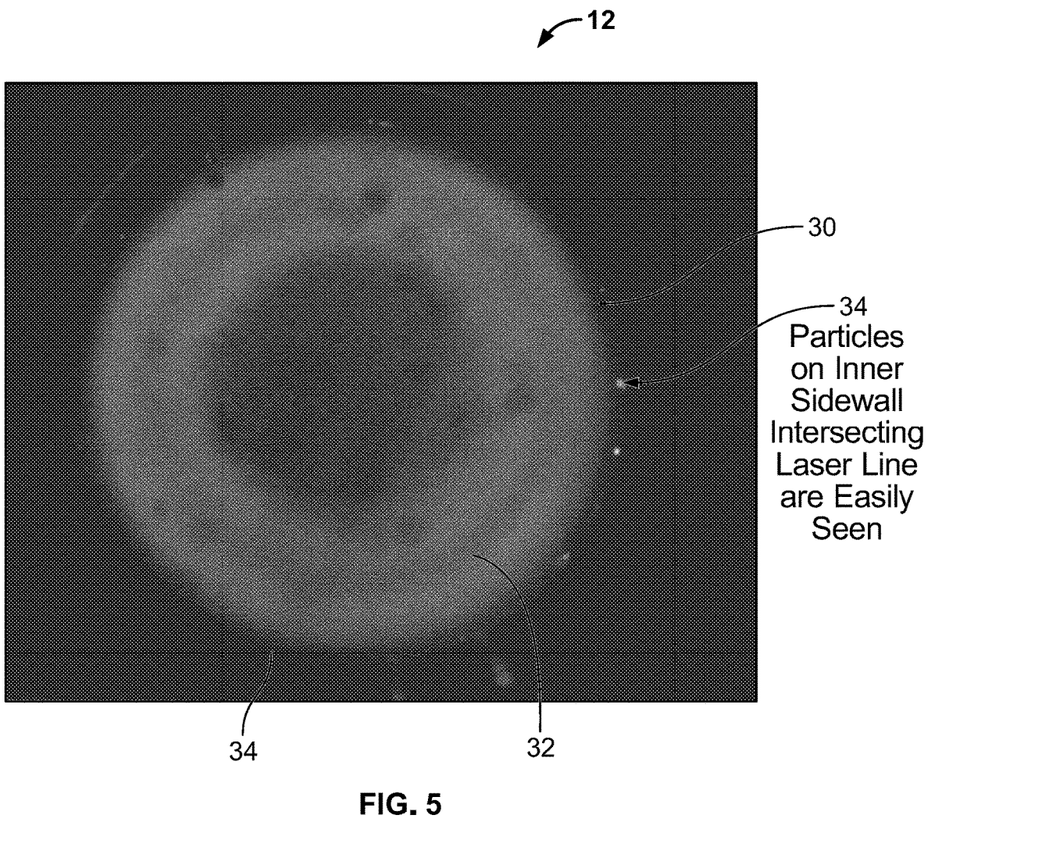
FIG. 5 illustrates a top plan image of a container taken with the setup of FIG. 4 in accordance with various embodiments of the present disclosure.

In a preferred form, the light source 42 can be a laser line generator as shown in FIG. 4. The laser line generator generates a flat line of illumination and can be projected within the focus plane of the camera device 14. As shown in FIG. 5, this configuration brightly illuminates any foreign matter 34, if there are any, and darkens the background in the resulting image captured by the camera device 14. Further, as shown, the laser line generator can be movable along a path parallel with the longitudinal axis L to selectively illuminate desired planes. Movement of the laser line generator can be controlled by the robot 16 at the behest of the controller 40 or a secondary robot or actuator. Of course, other light sources, such as light emitting diodes, and setups to focus the illumination of the light source can be utilized.

With all the above embodiments, if the analysis detects foreign matter 34 in the container 12, the control circuit 40 can send out a detection signal or message to a user computing device. The message can include an identification of the contaminated container 12 and, if applicable, an identification of a batch that the container 12 came from. Further, for automation of the process, an identification of foreign matter 34 can cause the control circuit 40 to reject the contaminated container 12 or batch of containers 12 by diverting or otherwise sending the container(s) to a reject bin or the like.

Systems 10 as described herein can be utilized to detect over 80% of particles larger than 70 um in diameter or fiber strands that are 10 um in diameter and over 200 um long. Further improvements are possible, however, with optimizations and advancements in lighting configurations, camera/lens configurations, and imaging processing.

The above description describes various devices, assemblies, components, subsystems and methods for use related to drug product containers, including inspecting such containers prior to filling. The devices, assemblies, components, subsystems, or methods can further comprise or be used with a drug, for example certain methods according to the present disclosure may include filling the containers after inspection, where those containers are filled with drugs that can include but are not limited to those drugs identified below as well as their generic and biosimilar counterparts. The term drug, as used herein, can be used interchangeably with other similar terms and can be used to refer to any type of medicament or therapeutic material including traditional and non-traditional pharmaceuticals, nutraceuticals, supplements, biologics, biologically active agents and compositions, large molecules, biosimilars, bioequivalents, therapeutic antibodies, polypeptides, proteins, small molecules and generics. Non-therapeutic injectable materials are also encompassed. The drug may be in liquid form, a lyophilized form, or in a reconstituted from lyophilized form. The following example list of drugs should not be considered as all-inclusive or limiting.

The drug will be contained in a reservoir. In some instances, the reservoir is a primary container that is either filled or pre-filled for treatment with the drug. The primary container can be a vial, a cartridge or a pre-filled syringe.

In some embodiments, the reservoir of the drug delivery device may be filled with or the device can be used with colony stimulating factors, such as granulocyte colony-stimulating factor (G-CSF). Such G-CSF agents include but are not limited to Neulasta® (pegfilgrastim, pegylated filgastrim, pegylated G-CSF, pegylated hu-Met-G-CSF) and Neupogen® (filgrastim, G-CSF, hu-MetG-CSF).

In other embodiments, the drug delivery device may contain or be used with an erythropoiesis stimulating agent (ESA), which may be in liquid or lyophilized form. An ESA is any molecule that stimulates erythropoiesis. In some embodiments, an ESA is an erythropoiesis stimulating protein. As used herein, "erythropoiesis stimulating protein" means any protein that directly or indirectly causes activation of the erythropoietin receptor, for example, by binding to and causing dimerization of the receptor. Erythropoiesis stimulating proteins include erythropoietin and variants, analogs, or derivatives thereof that bind to and activate erythropoietin receptor; antibodies that bind to erythropoietin receptor and activate the receptor; or peptides that bind to and activate erythropoietin receptor. Erythropoiesis stimulating proteins include, but are not limited to, Epogen® (epoetin alfa), Aranesp® (darbepoetin alfa), Dynepo® (epoetin delta), Mircera® (methoxy polyethylene glycol-epoetin beta), Hematide®, MRK-2578, INS-22, Retacrit® (epoetin zeta), Neorecormon® (epoetin beta), Silapo® (epoetin zeta), Binocrit® (epoetin alfa), epoetin alfa Hexal, Abseamed® (epoetin alfa), Ratioepo® (epoetin theta), Eporatio® (epoetin theta), Biopoin® (epoetin theta), epoetin alfa, epoetin beta, epoetin iota, epoetin omega, epoetin delta, epoetin zeta, epoetin theta, and epoetin delta, pegylated erythropoietin, carbamylated erythropoietin, as well as the molecules or variants or analogs thereof.

Among particular illustrative proteins are the specific proteins set forth below, including fusions, fragments, analogs, variants or derivatives thereof: OPGL specific antibodies, peptibodies, related proteins, and the like (also referred to as RANKL specific antibodies, peptibodies and the like), including fully humanized and human OPGL specific antibodies, particularly fully humanized monoclonal antibodies; Myostatin binding proteins, peptibodies, related proteins, and the like, including myostatin specific peptibodies; IL-4 receptor specific antibodies, peptibodies, related proteins, and the like, particularly those that inhibit activities mediated by binding of IL-4 and/or IL-13 to the receptor; Interleukin 1-receptor 1 ("IL1-R1") specific antibodies, peptibodies, related proteins, and the like; Ang2 specific antibodies, peptibodies, related proteins, and the like; NGF specific antibodies, peptibodies, related proteins, and the like; CD22 specific antibodies, peptibodies, related proteins, and the like, particularly human CD22 specific antibodies, such as but not limited to humanized and fully human antibodies, including but not limited to humanized and fully human monoclonal antibodies, particularly including but not limited to human CD22 specific IgG antibodies, such as, a dimer of a human-mouse monoclonal hLL2 gamma-chain disulfide linked to a human-mouse monoclonal hLL2 kappa-chain, for example, the human CD22 specific fully humanized antibody in Epratuzumab, CAS registry number 501423-23-0; IGF-1 receptor specific antibodies, peptibodies, and related proteins, and the like including but not limited to anti-IGF-1R antibodies; B-7 related protein 1 specific antibodies, peptibodies, related proteins and the like ("B7RP-1" and also referring to B7H2, ICOSL, B7h, and CD275), including but not limited to B7RP-specific fully human monoclonal IgG2 antibodies, including but not limited to fully human IgG2 monoclonal antibody that binds an epitope in the first immunoglobulin-like domain of B7RP-1, including but not limited to those that inhibit the interaction of B7RP-1 with its natural receptor, ICOS, on activated T cells; IL-15 specific antibodies, peptibodies, related proteins, and the like, such as, in particular, humanized monoclonal antibodies, including but not limited to HuMax IL-15 antibodies and related proteins, such as, for instance, 146B7; IFN gamma specific antibodies, peptibodies, related proteins and the like, including but not limited to human IFN gamma specific antibodies, and including but not limited to fully human anti-IFN gamma antibodies; TALL-1 specific antibodies, peptibodies, related proteins, and the like, and other TALL specific binding proteins; Parathyroid hormone ("PTH") specific antibodies, peptibodies, related proteins, and the like; Thrombopoietin receptor ("TPO-R") specific antibodies, peptibodies, related proteins, and the like;Hepatocyte growth factor ("HGF") specific antibodies, peptibodies, related proteins, and the like, including those that target the HGF/SF:cMet axis (HGF/SF:c-Met), such as fully human monoclonal antibodies that neutralize hepatocyte growth factor/scatter (HGF/SF); TRAIL-R2 specific antibodies, peptibodies, related proteins and the like; Activin A specific antibodies, peptibodies, proteins, and the like; TGF-beta specific antibodies, peptibodies, related proteins, and the like; Amyloid-beta protein specific antibodies, peptibodies, related proteins, and the like; c-Kit specific antibodies, peptibodies, related proteins, and the like, including but not limited to proteins that bind c-Kit and/or other stem cell factor receptors; OX40L specific antibodies, peptibodies, related proteins, and the like, including but not limited to proteins that bind OX40L and/or other ligands of the OX40 receptor; Activase® (alteplase, tPA); Aranesp® (darbepoetin alfa); Epogen® (epoetin alfa, or erythropoietin); GLP-1, Avonex® (interferon beta-1a); Bexxar® (tositumomab, anti-CD22 monoclonal antibody); Betaseron® (interferon-beta); Campath® (alemtuzumab, anti-CD52 monoclonal antibody); Dynepo® (epoetin delta); Velcade® (bortezomib); MLN0002 (anti-α4ß7 mAb); MLN1202 (anti-CCR2 chemokine receptor mAb); Enbrel® (etanercept, TNF-receptor/Fc fusion protein, TNF blocker); Eprex® (epoetin alfa); Erbitux® (cetuximab, anti-EGFR/HER1/c-ErbB-1); Genotropin® (somatropin, Human Growth Hormone); Herceptin® (trastuzumab, anti-HER2/neu (erbB2) receptor mAb); Humatrope® (somatropin, Human Growth Hormone); Humira® (adalimumab); Vectibix® (panitumumab), Xgeva® (denosumab), Prolia® (denosumab), Enbrel® (etanercept, TNF-receptor/Fc fusion protein, TNF blocker), Nplate® (romiplostim), rilotumumab, ganitumab, conatumumab, brodalumab, insulin in solution; Infergen® (interferon alfacon-1); Natrecor® (nesiritide; recombinant human B-type natriuretic peptide (hBNP); Kineret® (anakinra); Leukine® (sargamostim, rhuGM-CSF); LymphoCide® (epratuzumab, anti-CD22 mAb); Benlysta™ (lymphostat B, belimumab, anti-BlyS mAb); Metalyse® (tenecteplase, t-PA analog); Mircera® (methoxy polyethylene glycol-epoetin beta); Mylotarg® (gemtuzumab ozogamicin); Raptiva® (efalizumab); Cimzia® (certolizumab pegol, CDP 870); Soliris™ (eculizumab); pexelizumab (anti-C5 complement); Numax® (MEDI-524); Lucentis® (ranibizumab); Panorex® (17-1A, edrecolomab); Trabio® (lerdelimumab); TheraCim hR3 (nimotuzumab); Omnitarg (pertuzumab, 2C4); Osidem® (IDM-1); OvaRex® (B43.13); Nuvion® (visilizumab); cantuzumab mertansine (huC242-DM1); NeoRecormon® (epoetin beta); Neumega® (oprelvekin, human interleukin-11); Orthoclone OKT3® (muromonab-CD3, anti-CD3 monoclonal antibody); Procrit® (epoetin alfa); Remicade® (infliximab, anti-TNFα monoclonal antibody); Reopro® (abciximab, anti-GP IIb/IIIa receptor monoclonal antibody); Actemra® (anti-IL6 Receptor mAb); Avastin® (bevacizumab), HuMax-CD4 (zanolimumab); Rituxan® (rituximab, anti-CD20 mAb); Tarceva® (erlotinib); Roferon-A®-(interferon alfa-2a); Simulect® (basiliximab); Prexige® (lumiracoxib); Synagis® (palivizumab); 146B7-CHO (anti-IL15 antibody, see U.S. Pat. No. 7,153, 507); Tysabri® (natalizumab, anti-α4integrin mAb); Valortim® (MDX-1303, anti-*B. anthracis* protective antigen mAb); ABthrax™; Xolair® (omalizumab); ETI211 (anti-MRSA mAb); IL-1 trap (the Fc portion of human IgG1 and the extracellular domains of both IL-1 receptor components (the Type I receptor and receptor accessory protein)); VEGF trap (Ig domains of VEGFR1 fused to IgG1 Fc); Zenapax® (daclizumab); Zenapax® (daclizumab, anti-IL-2Rα mAb); Zevalin® (ibritumomab tiuxetan); Zetia® (ezetimibe); Orencia® (atacicept, TACI-Ig); anti-CD80 monoclonal antibody (galiximab); anti-CD23 mAb (lumiliximab); BR2-Fc (huBR3/huFc fusion protein, soluble BAFF antagonist); CNTO 148 (golimumab, anti-TNFα mAb); HGS-ETR1 (mapatumumab; human anti-TRAIL Receptor-1 mAb); HuMax-CD20 (ocrelizumab, anti-CD20 human mAb); HuMax-EGFR (zalutumumab); M200 (volociximab, anti-α5β1 integrin mAb); MDX-010 (ipilimumab, anti-CTLA-4 mAb and VEGFR-1 (IMC-18F1); anti-BR3 mAb; anti-*C. difficile* Toxin A and Toxin B C mAbs MDX-066 (CDA-1) and MDX-1388); anti-CD22 dsFv-PE38 conjugates (CAT-3888 and CAT-8015); anti-CD25 mAb (HuMax-TAC); anti-CD3 mAb (NI-0401); adecatumumab; anti-CD30 mAb (MDX-060); MDX-1333 (anti-IFNAR); anti-CD38 mAb (HuMax CD38); anti-CD40L mAb; anti-Cripto mAb; anti-CTGF Idiopathic Pulmonary Fibrosis Phase I Fibrogen (FG-3019); anti-CTLA4 mAb; anti-eotaxin1 mAb (CAT-213); anti-FGF8 mAb; anti-ganglioside GD2 mAb; anti-ganglioside GM2 mAb; anti-GDF-8 human mAb (MYO-029); anti-GM-CSF Receptor mAb (CAM-3001); anti-HepC mAb (HuMax HepC); anti-IFNα mAb (MEDI-545, MDX-1103); anti-IGF1R mAb; anti-IGF-1R mAb (HuMax-Inflam); anti-IL12 mAb (ABT-874); anti-IL12/IL23 mAb (CNTO 1275); anti-IL13 mAb (CAT-354); anti-IL2Ra mAb (HuMax-TAC); anti-IL5 Receptor mAb; anti-integrin receptors mAb (MDX-018, CNTO 95); anti-IP10 Ulcerative Colitis mAb (MDX-1100); BMS-66513; anti-Mannose Receptor/hCG8 mAb (MDX-1307); anti-mesothelin dsFv-PE38 conjugate (CAT-5001); anti-PD1mAb (MDX-1106 (ONO-4538)); anti-PDGFRα antibody (IMC-3G3); anti-TGFB mAb (GC-1008); anti-TRAIL Receptor-2 human mAb (HGS-ETR2); anti-TWEAK mAb; anti-VEGFR/Flt-1 mAb; and anti-ZP3 mAb (HuMax-ZP3).

In some embodiments, the drug delivery device may contain or be used with a sclerostin antibody, such as but not limited to romosozumab, blosozumab, or BPS 804 (Novartis) and in other embodiments, a monoclonal antibody (IgG) that binds human Proprotein Convertase Subtilisin/Kexin Type 9 (PCSK9). Such PCSK9 specific antibodies include, but are not limited to, Repatha® (evolocumab) and Praluent® (alirocumab). In other embodiments, the drug delivery device may contain or be used with rilotumumab, bixalomer, trebananib, ganitumab, conatumumab, motesanib diphosphate, brodalumab, vidupiprant or panitumumab. In some embodiments, the reservoir of the drug delivery device may be filled with or the device can be used with IMLYGIC® (talimogene laherparepvec) or another oncolytic HSV for the treatment of melanoma or other cancers including but are not limited to OncoVEXGALV/CD; OrienX010; G207, 1716; NV1020; NV12023; NV1034; and NV1042. In some embodiments, the drug delivery device may contain or be used with endogenous tissue inhibitors of metalloproteinases (TIMPs) such as but not limited to TIMP-3. Antagonistic antibodies for human calcitonin gene-related peptide (CGRP) receptor such as but not limited to erenumab and bispecific antibody molecules that target the CGRP receptor and other headache targets may also be delivered with a drug delivery device of the present disclosure. Additionally, bispecific T cell engager (BiTE®) antibodies such as but not limited to BLINCYTO® (blinatumomab) can be used in or with the drug delivery device of the present disclosure. In some embodiments, the drug delivery device may contain or be used with an APJ large molecule agonist such as but not limited to apelin or analogues thereof. In some embodiments, a therapeutically effective amount of an anti-thymic stromal lymphopoietin (TSLP) or TSLP receptor antibody is used in or with the drug delivery device of the present disclosure.

Although the drug delivery devices, assemblies, components, subsystems and methods have been described in terms of exemplary embodiments, they are not limited thereto. The detailed description is to be construed as exemplary only and does not describe every possible embodiment of the present disclosure. Numerous alternative embodiments could be implemented, using either current technology or technology developed after the filing date of this patent that would still fall within the scope of the claims defining the invention(s) disclosed herein.

Those skilled in the art will recognize that a wide variety of modifications, alterations, and combinations can be made with respect to the above described embodiments without departing from the spirit and scope of the invention(s) disclosed herein, and that such modifications, alterations, and combinations are to be viewed as being within the ambit of the inventive concept(s).

What is claimed is:

1. An inspection system for a drug container for the identification of foreign matter, the system comprising:
   a camera device including a lens;
   a robot having a portion movable along a linear path and portions movable relative to one another, the camera device aligned with a longitudinal axis of the drug container, such that the camera device is configured to capture a series of images of an interior surface of a sidewall and/or a bottom wall of the drug container while the robot causes relative movement between the camera device and the drug container along the linear path; and
   a control circuit in communication with the camera device, the control circuit including a processor, a memory, and logic stored on the memory and executable by the processor to receive the series of images from the camera device and process the series of images to identify foreign matter shown in the images, wherein the portion of the robot comprises a vertical portion, and the portions include the vertical portion, a depth portion, and a width portion.

2. The inspection system of claim 1, wherein the lens comprises a telecentric lens or 360° optics.

3. The inspection system of claim 1, wherein an aperture of the lens is opened to a maximum setting.

4. The inspection system of claim 1, wherein the depth portion is configured to move the camera device along a row of drug containers and the width portion is configured to move the camera device over to adjacent rows of drug containers.

5. The inspection system of claim 1, wherein the logic is further executable by the processor to operate the robot.

6. The inspection system of claim 1, wherein the logic executable by the processor to process the series of images to identify foreign matter shown in the images comprises the logic executable by the processor to compare a particular image of the series of images to at least one image taken immediately before or after the particular image to identify differences.

7. The inspection system of claim 1, wherein the logic executable by the processor to process the series of images to identify foreign matter shown in the images comprises the logic executable by the process to combine the series of images into a combined image showing all of the interior surface of the sidewall of the drug container in focus to identify foreign matter.

8. The inspection system of claim 1, further comprising a light source oriented to project light at the drug container and illuminate a portion of the drug container within a depth of field of the camera device.

9. The inspection system of claim 8, wherein the light source is movable along the drug container to thereby illuminate a portion of the drug container within a depth of field of the camera device as the camera device is moved along the linear path.

10. The inspection system of claim 8, wherein the light source comprises a plurality of light sources, each of the plurality of light sources oriented to illuminate a portion of the drug container.

11. A method of inspecting a drug container for foreign matter, the method comprising:
   orienting a camera device along a longitudinal axis of a drug container;
   moving the camera device via a robot having portions movable relative to one another or the drug container along the longitudinal axis;
   operating the camera device to capture a series of images of an interior surface of a sidewall of the drug container;
   processing the series of images with a control circuit to identify foreign matter shown in the series of images; and
   moving the camera device along the longitudinal axis including one or more of: (1) operating the robot to move a portion thereof along a linear path: and (2) operating the robot to move the camera device with one or more of a depth portion or a width portion.

12. The method of claim 11, wherein moving the camera device along the longitudinal axis including, the camera device coupled to the portion of the robot.

13. The method of claim 12, wherein operating the robot to move the camera device with the depth portion comprises operating the robot to move the camera device along a row of drug containers with the depth portion and operating the robot to move the camera device with the width portion comprises operating the robot to move the camera device to adjacent rows of drug containers with the width portion.

14. The method of claim 12, wherein operating the camera device and operating the robot comprises operating the camera device and robot simultaneously with the control circuit to produce the series of images of the interior surface of the sidewall of the drug container.

15. The method of claim 11, wherein processing the series of images comprises comparing a particular image of the series of images to at least one image taken immediately before or after the particular image to identify differences.

16. The method of claim 11, wherein processing the series of images comprises combining the series of images into a combined image showing all of the interior surface of the sidewall of the drug container in focus to identify foreign matter.

17. The method of claim 11, further comprising sending a detection signal with the control circuit in response to identifying foreign matter in the series of images.

18. The method of claim 11, further comprising operating a light source to project light at the drug container and illuminate portion of the drug container within a depth of field of the camera device.

19. The method of claim 18, further comprising moving the light source along a height of the drug container corresponding to movement of the camera device along the longitudinal axis.

20. The method of claim 18, wherein operating the light source comprises operating a plurality of light sources, each of the plurality of light sources oriented to illuminate a portion of the drug container.

* * * * *

UNITED STATES PATENT AND TRADEMARK OFFICE
CERTIFICATE OF CORRECTION

PATENT NO. : 11,499,922 B2
APPLICATION NO. : 16/977025
DATED : November 15, 2022
INVENTOR(S) : Thomas C. Pearson et al.

It is certified that error appears in the above-identified patent and that said Letters Patent is hereby corrected as shown below:

On the Title Page

At item (57), Line 3, "with" should be -- it with --.

In the Claims

Column 12, Line 19, Claim 11, "path:" should be -- path; --.

Signed and Sealed this
Twentieth Day of February, 2024

*Katherine Kelly Vidal*
Katherine Kelly Vidal
*Director of the United States Patent and Trademark Office*